(12) United States Patent
Hong

(10) Patent No.: US 12,452,833 B2
(45) Date of Patent: Oct. 21, 2025

(54) PAGING METHOD AND APPARATUS, AND TRAVEL ROUTE REPORTING METHOD AND APPARATUS

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 832 days.

(21) Appl. No.: 17/628,890

(22) PCT Filed: Jul. 23, 2019

(86) PCT No.: PCT/CN2019/097349
§ 371 (c)(1),
(2) Date: Jan. 20, 2022

(87) PCT Pub. No.: WO2021/012194
PCT Pub. Date: Jan. 28, 2021

(65) Prior Publication Data
US 2022/0256498 A1    Aug. 11, 2022

(51) Int. Cl.
*H04W 68/02*    (2009.01)
*H04W 64/00*    (2009.01)

(52) U.S. Cl.
CPC ........... *H04W 68/02* (2013.01); *H04W 64/00* (2013.01)

(58) Field of Classification Search
CPC ..... H04W 4/029; H04W 64/00; H04W 68/02; H04W 68/06

USPC ....... 455/456, 458, 436, 558, 457, 405, 419, 455/456.6
See application file for complete search history.

(56) References Cited

U.S. PATENT DOCUMENTS

| 7,797,002 | B2 * | 9/2010 | Take | H04W 68/00 |
| | | | | 455/458 |
| 8,260,323 | B1 * | 9/2012 | Bronner | H04W 64/00 |
| | | | | 455/456.6 |
| 9,380,594 | B1 * | 6/2016 | Malmirchegini | H04W 24/08 |
| 9,661,607 | B2 * | 5/2017 | Iwai | H04W 68/08 |
| 10,117,223 | B1 | 10/2018 | Oroskar et al. | |

(Continued)

FOREIGN PATENT DOCUMENTS

| CN | 106304336 A | 1/2017 |
| CN | 107623946 A | 1/2018 |

(Continued)

*Primary Examiner* — Joseph Arevalo
(74) *Attorney, Agent, or Firm* — Volpe Koenig

(57) ABSTRACT

A paging method, comprising: receiving a travel route of a terminal; determining a target base station corresponding to a cell through which the travel route passes; and if the terminal is to be paged, sending to the target base station paging signals used for paging the terminal so that the target base station broadcasts the paging signals. According to embodiments of the present disclosure, a target base station may be determined according to a cell through which a travel route of the terminal passes, and then the target base station broadcasts paging signals. When a terminal is located in a certain tracking area, a travel route of the terminal generally will not pass through cells corresponding to all of the base stations in the tracking area, but will only pass through cells corresponding to some of the base stations in the tracking area.

17 Claims, 13 Drawing Sheets

Generate a travel route in an application of the terminal according to the received first instruction — S1'

Send the travel route to a server corresponding to the application, so as to report the travel route to a core network through the server — S2'

Send a real-time position of the terminal to the server corresponding to the application according to the received third instruction, so as to report the real-time position to the core network through the server — S5'

(56) References Cited

U.S. PATENT DOCUMENTS

| | | | | |
|---|---|---|---|---|
| 2012/0236776 A1* | 9/2012 | Zhang | H04L 12/18 | |
| | | | 370/312 | |
| 2015/0163637 A1* | 6/2015 | Castmo | H04W 60/00 | |
| | | | 455/456.1 | |
| 2015/0237592 A1* | 8/2015 | Kim | H04W 72/23 | |
| | | | 455/435.1 | |
| 2016/0192268 A1* | 6/2016 | Takeda | H04W 68/005 | |
| | | | 370/331 | |
| 2020/0412842 A1* | 12/2020 | Park | H04W 80/10 | |
| 2021/0112515 A1* | 4/2021 | Zou | H04W 12/08 | |
| 2022/0116798 A1* | 4/2022 | Yuan | H04W 40/12 | |
| 2022/0182898 A1* | 6/2022 | Cui | H04B 7/0617 | |
| 2022/0256436 A1* | 8/2022 | Guo | H04L 69/22 | |
| 2022/0256498 A1* | 8/2022 | Hong | H04W 4/029 | |
| 2022/0369282 A1* | 11/2022 | Bhattad | H04W 68/02 | |
| 2023/0022005 A1* | 1/2023 | Qiao | H04W 64/00 | |
| 2023/0232204 A1* | 7/2023 | Ryu | H04W 8/18 | |
| | | | 370/329 | |
| 2023/0337089 A1* | 10/2023 | Ryu | H04W 8/24 | |
| 2024/0080940 A1* | 3/2024 | Fujishiro | H04W 68/12 | |

FOREIGN PATENT DOCUMENTS

| | | |
|---|---|---|
| CN | 108401477 A | 8/2018 |
| CN | 109075856 A | 12/2018 |
| CN | 109196793 A | 1/2019 |
| CN | 109417421 A | 3/2019 |

\* cited by examiner

PAGING METHOD AND APPARATUS, AND TRAVEL ROUTE REPORTING METHOD AND APPARATUS

CROSS-REFERENCE TO RELATED APPLICATION

The present application is a U.S. National Phase of International Patent Application Serial No. PCT/CN2019/097349 filed on Jul. 23, 2019, the entire content of which is hereby incorporated by reference in its entirety for all purposes.

BACKGROUND

In related technologies, when a core network needs to page a terminal, a TA (Tracking Area) where the terminal is located needs to be determined, and then all base stations in the TA are triggered to send paging signals.

This way of triggering all base stations in the TA to send paging signals occupies a large amount of communication resources of the base stations.

SUMMARY

The disclosure relates to the field of communication technology, in particular to a paging method, a paging apparatus, a travel route reporting method, a travel route reporting apparatus, an electronic device, and a computer-readable storage medium.

In view of this, the examples of the disclosure propose a paging method, a paging apparatus, a travel route reporting method, a travel route reporting apparatus, an electronic device, and a computer-readable storage medium.

According to a first aspect of the examples of the disclosure, a paging method is proposed, applicable to a core network, the method including:
  receiving a travel route of a terminal;
  determining target base stations corresponding to cells passed by the travel route; and
  in response to determining that the terminal needs to be paged, sending to the target base stations, paging signals for paging the terminal, so that the target base stations broadcast the paging signals.

According to a second aspect of the examples of the disclosure, a travel route reporting method is proposed, applicable to a terminal, the method including:
  generating a travel route in an application of the terminal according to a received first instruction; and
  sending the travel route to a server corresponding to the application, so as to report the travel route to a core network through the server.

According to a third aspect of the examples of the disclosure, an electronic device is proposed, including:
  a processor; and
  a memory for storing a processor executable instruction;
  the processor is configured to perform the steps of the paging method described in the first aspect of the present disclosure, thereby implementing the paging method in the first aspect.

According to a fourth aspect of the examples of the disclosure, an electronic device is proposed, including:
  a processor; and
  a memory for storing processor executable instructions,
  the processor is configured to perform the steps of the paging method described in the second aspect of the present disclosure by executing the processor-executable instructions, thereby implementing the travel route reporting method described in the second aspect of the present disclosure.

According to a fifth aspect of the examples of the disclosure, a non-transitory computer-readable storage medium is proposed, storing a computer program thereon, the computer program comprising processor executable instructions, and when the instructions are executed by a processor, the processor is caused to perform the steps of the paging method in the first aspect of the present disclosure thereby implementing the method in the first aspect of the disclosure.

According to an sixth aspect of the examples of the disclosure, a non-transitory computer-readable storage medium is proposed, storing a computer program thereon, the computer program comprising processor-executable instructions, and when the instructions are executed by a processor, the processor is caused to perform the steps of the travel route reporting method in the second aspect of the present disclosure thereby implementing the method in the second aspect of the disclosure.

BRIEF DESCRIPTION OF THE FIGURES

In order to describe the technical solutions in the examples of the disclosure more clearly, the following briefly introduces the accompanying drawings illustrating the described examples. Of course, the accompanying drawings in the following description show but a few examples of the many possible variations that will fall within the scope of the disclosure, and those of ordinary skill in the art, upon reading this disclosure may derive other variations from these drawings without any creative efforts and without undue experimentation.

DETAILED DESCRIPTION

The technical solutions in the examples of the disclosure will be clearly and completely described below with reference to the accompanying drawings in the examples of the disclosure. Of course, the examples described are only some of the many variations of these examples within the scope of the disclosure. All of these variations of the examples can be obtained by those of ordinary skill in the art based on the examples of the disclosure without any creative efforts, and all of these are intended to fall within the protection scope of the disclosure.

Figure 1:
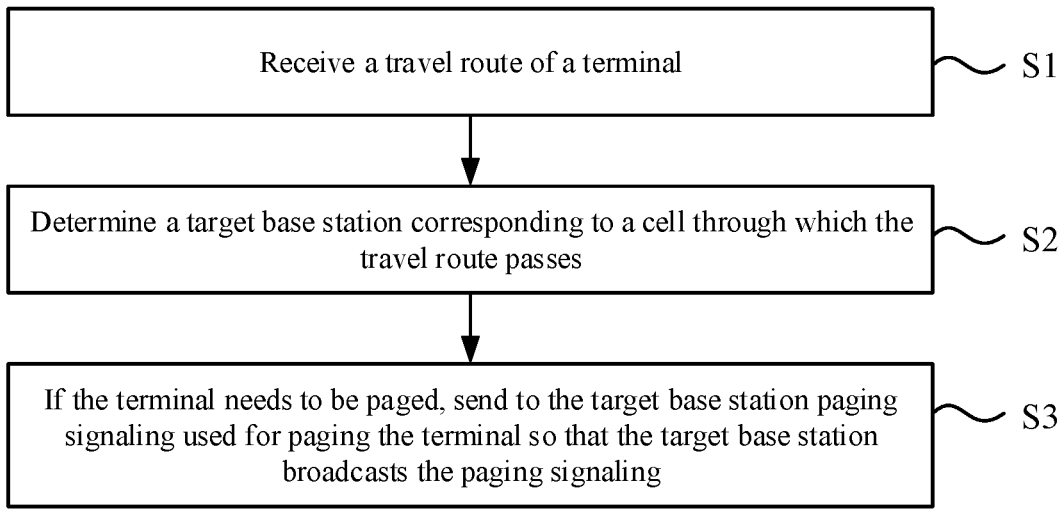
FIG. 1 is a flowchart showing a paging method according to an example of the disclosure.

FIG. 1 is a flowchart showing a paging method according to an example of the disclosure. The paging method shown in this example may be applied to a core network, such as a core network in 5G NR (New Radio). As shown in FIG. 1, the paging method may include the following steps:

In step S1, a travel route of a terminal is received;

In step S2, target base stations corresponding to cells passed by the terminal on the travel route are determined;

In step S3, if the terminal is to be paged, paging signals for paging the terminal are sent to the target base stations, so that the target base stations broadcast the paging signals.

In an example, the user can input a first instruction to the terminal to generate a travel route by executing an application of the terminal. The terminal can comprise, but is not limited to, one or more electronic devices such as a cell phone, a tablet computer, and a wearable device. The application includes, but is not limited to, a navigation application. The terminal may communicate with the base station, for example, communicate based on 5G NR.

Taking a cell phone as an example, the user can input a current position to an application of the cell phone. Alternatively, the cell phone automatically determines the current position of the terminal as a starting position of the travel route. Alternatively, then the user inputs the starting position to the terminal, and the application can generate a travel route from the starting position to an ending position according to road information between the starting position and the ending position.

After generating the travel route, the application can send the travel route to a server corresponding to the application, and then the server reports the travel route to the core network.

In an example, the core network can pre-store range information of cells corresponding to a base station, determine a range corresponding to cells the terminal will pass through according to the travel route of the terminal, determine target base stations corresponding to the cells through which the terminal will pass, and send paging signals to the target base stations when the terminal is to be paged. The paging signals are used to page the terminal, and the paging signals may carry identification information of the terminal. After receiving the paging signals, the base station can broadcast the paging signals.

When the terminal travels along the travel route, it may pass through a plurality of tracking areas. Therefore, in related technologies, all base stations in the tracking areas are to broadcast the paging signals one by one, and all the base stations in the tracking areas ultimately participate in broadcasting the signals.

According to the examples of the disclosure, target base stations can be determined according to cells through which by the terminal will pass along the travel route of the terminal, and then the target base stations broadcast paging signals; when the terminal is located in a certain tracking area, its travel route generally does not pass through cells corresponding to all base stations in the tracking area, but passes through cells corresponding to at least some of the base stations; therefore, only some of the base stations in the tracking area can broadcast the paging signals, which reduces the number of base stations broadcasting the signals and saves communication resources.

Figure 2:
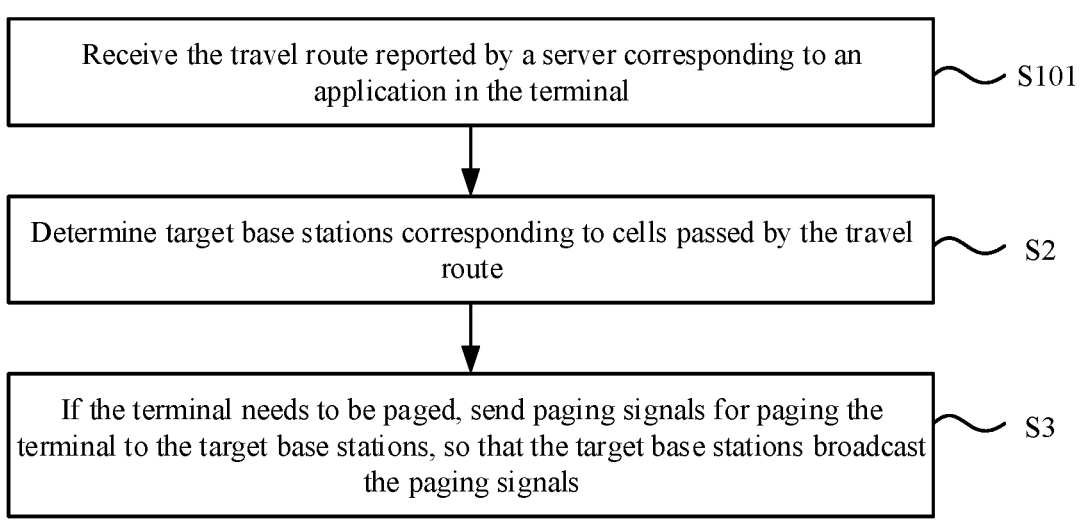
FIG. 2 is a flowchart showing another paging method according to an example of the disclosure.

FIG. 2 is a schematic flowchart showing another paging method according to an example of the disclosure. As shown in FIG. 2, the receiving a travel route of a terminal includes:

In step S101, the travel route reported by a server corresponding to an application in the terminal is received.

In an example, the server corresponding to the application in the terminal can communicate with the core network. After generating the travel route, the application in the terminal can send the travel route to the server corresponding to the application, and then the server reports the travel route to the core network.

In some embodiments, the server corresponding to the application in the terminal comprises an application function of the core network.

In an example, the application function may comprise an Application Function (AF) of the core network. The server may report the travel route to the core network through an Naf interface of the application function comprising the server.

In some embodiments, the method comprises an access and mobility management function of the core network.

In an example, the paging method may implement an Access and Mobility Management Function (AMF) of the core network.

In some embodiments, the step of receiving a travel route of a terminal includes:

receiving the travel route through an Namf interface of the access and mobility management function.

In an example, the travel route can be received through an Namf interface of the access and mobility management function.

The paging method described in the example of the disclosure can be implemented based on a 5G architecture. The terminal can send the travel route to the server, the server serving comprising an application function in the core network can report the travel route through the Naf interface, and the access and mobility management function in the core network can receive the travel route reported by the server through the Namf interface.

Figure 3:
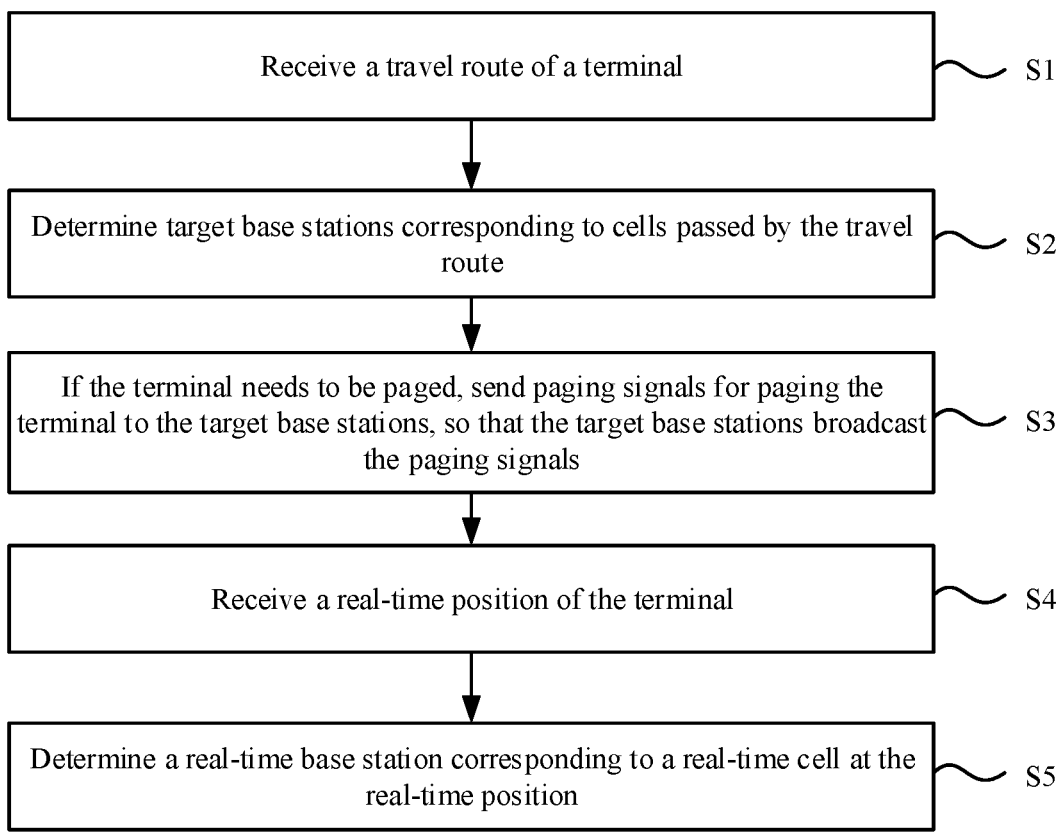
FIG. 3 is a flowchart showing yet another paging method according to an example of the disclosure.

FIG. 3 is a flowchart showing yet another paging method according to an example of the disclosure. As shown in FIG. 3, the method further includes, in addition to S1-S3:

In step S4, a real-time position of the terminal is received;

In step S5, a real-time base station corresponding to a real-time cell at the real-time position is determined.

In an example, the terminal can also report its own real-time position to the core network. For example, the application in the terminal can periodically determine the real-time position of the terminal, and then a server of the application reports the determined real-time position to the core network. The core network can determine the real-time base station corresponding to the real-time cell at the real-time position based on the real-time position of the terminal and pre-stored range information of cells corresponding to the base station.

Figure 4:
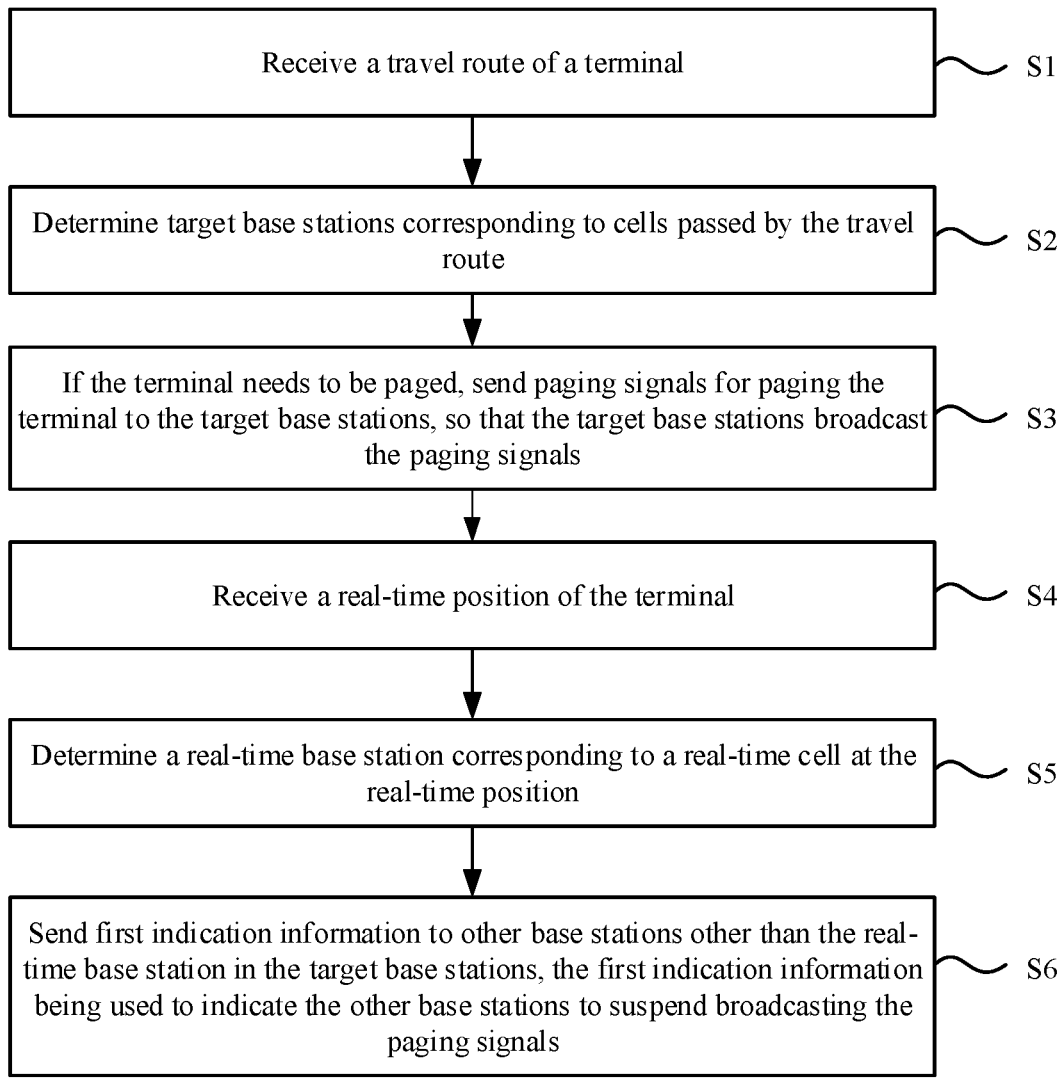
FIG. 4 is a flowchart showing yet another paging method according to an example of the disclosure.

FIG. 4 is a flowchart showing yet another paging method according to an example of the disclosure. As shown in FIG. 4, in addition to S1-S5, the method further includes:

In step S6, first indication information is sent to target base stations other than the real-time base station, the first indication information being used to indicate to the other base stations, they may to suspend broadcasting the paging signals.

In an example, after the core network determines the real-time base station corresponding to the real-time cell at the real-time position, the core network can send first indication information to other base stations other than the real-time base station in the target base stations, to indicate to the other base stations, they may to suspend broadcasting the paging signals through the first indication information.

Because the core network determines the real-time base station corresponding to the real-time cell where the terminal is located according to the real-time position of the terminal, the terminal receives the paging signals sent by the real-time base station under normal circumstances. In this case, since the terminal can receive the paging signals, it is not necessary for other base stations other than the real-time base station to broadcast the signals. Therefore, base stations other than the real-time base station can be instructed by the first indication information to suspend broadcasting the paging signals, so as to reduce the communication resource consumption of the other base stations.

In an example, neighbor base stations corresponding to neighbor cells of the real-time cell can be determined, and then the first indication information is sent to target base stations other than the real-time base station and the neighbor base stations, to cause the base stations other than the real-time base station and the neighbor base stations to suspend broadcasting the paging signals. In some variations, the base stations corresponding to the real-time cell as well as base stations corresponding to the neighbor cells can broadcast the paging signals, so that the terminal can receive the paging signals from the neighbor cells when it is difficult to receive the paging signals from the base stations corresponding to the real-time cell.

Figure 5:
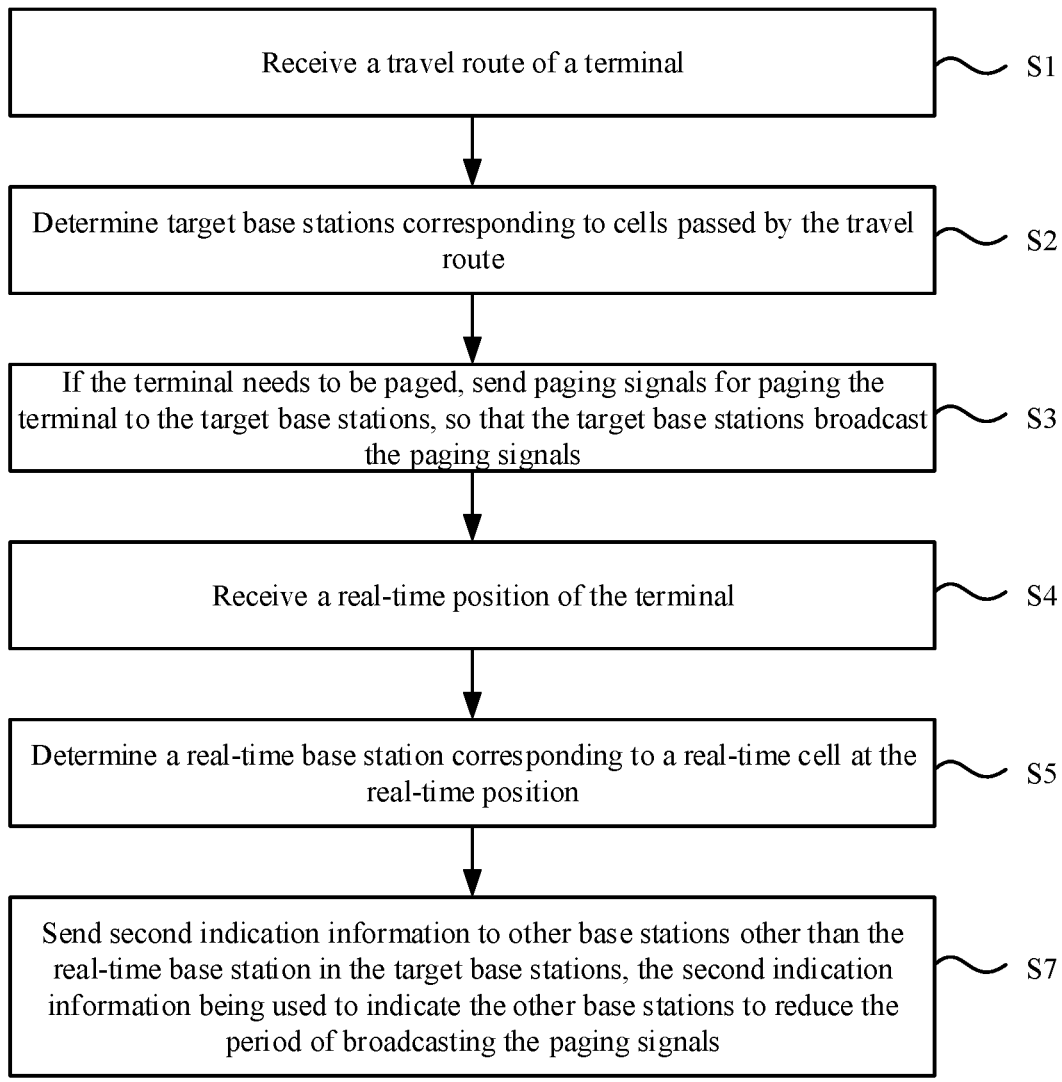
FIG. 5 is a flowchart showing yet another paging method according to an example of the disclosure.

FIG. 5 is a flowchart showing yet another paging method according to an example of the disclosure. As shown in FIG. 5, in addition to S1-S5, the method further includes:

In step S7, second indication information is sent to other base stations other than the real-time base station of the target base stations, the second indication information being used to indicate to the other base stations they can reduce the time period during which they broadcast the paging signals.

In an example, after the core network determines the real-time base station corresponding to the real-time cell at the real-time position, the core network can send second indication information to other base stations, i.e., base stations other than the real-time base station of the target base stations, to indicate to the other base stations they may reduce the time period during which they broadcast the paging signals, as indicated in the second indication information.

Because the core network determines the real-time base station corresponding to the real-time cell where the terminal is located according to the real-time position of the terminal, the terminal can receive the paging signals sent by the real-time base station under normal circumstances. In this case, since the terminal can receive the paging signals, it is not necessary for any base stations other than the real-time base station to broadcast the signals. However, there are special circumstances that can make it difficult for a terminal to receive the paging signals from the base station corresponding to the real-time cell. In those circumstances, base stations other than the real-time bases station are sought to broadcast the paging signals, to ensure that the terminal receives the paging signals. In those special circumstances, the other base stations can broadcast the paging signals, but the period during which broadcasting the paging signals by the other base stations occurs, can be reduced, so as to reduce the communication resource consumption of the other base stations.

In an example, neighbor base stations corresponding to neighbor cells of the real-time cell can be determined, then the first indication information is sent to the base stations other than the real-time base station and the neighbor base stations in the target base stations. The the second indication information is sent to the neighbor base stations. The base stations other than the real-time base station and the neighbor base stations are informed by the first indication information to suspend broadcasting the paging signals, and the neighbor base stations are informed by the second indication information to reduce the period of broadcasting the paging signals.

Figure 6:
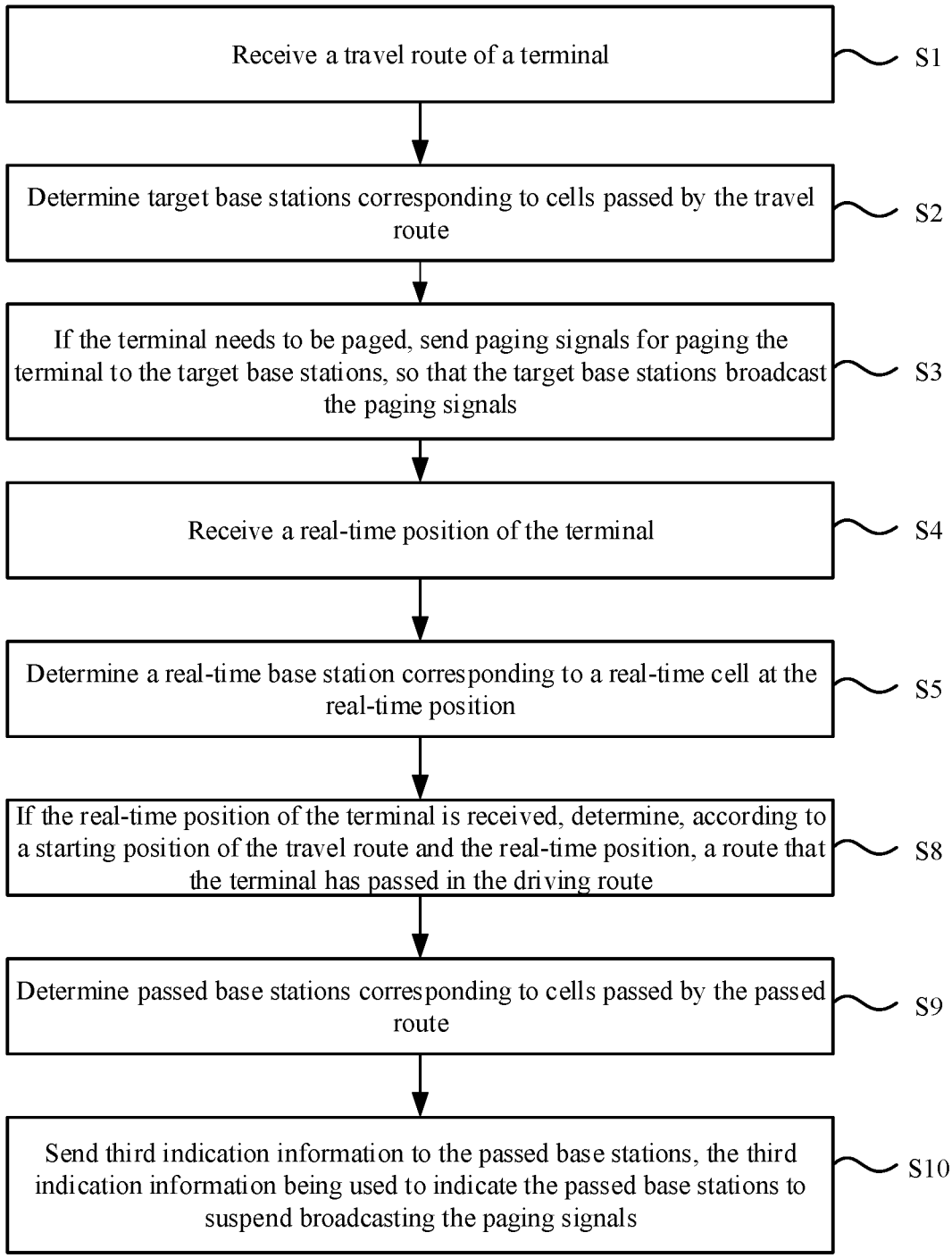
FIG. 6 is a flowchart showing yet another paging method according to an example of the disclosure.

FIG. 6 is a schematic flowchart showing yet another paging method according to an example of the disclosure. As shown in FIG. 6, in addition to S1-S5 the method further includes:

In step S8, if the real-time position of the terminal is received, a path that the terminal has traversed in the travel route is determined according to a starting position of the travel route and the real-time position;

In step S9, base stations corresponding to cells comprising the traversed path (hereinafter 'passed base stations') are determined;

In step S10, third indication information is sent to the passed base stations, the third indication information being used to indicate to the passed base stations to suspend broadcasting the paging signals.

In an example, after the core network determines the real-time base station corresponding to the real-time cell at the real-time position, the core network can further determine, according to a starting position of the travel route and the real-time position, a path that the terminal has traversed in the travel route and can determine the passed base stations, i.e., the base stations corresponding to cells comprising the traversed path in the travel route.

The passed base stations are base stations corresponding to cells through which that the terminal has already passed in moving along, or traversing the travel route. The terminal will not re-traverse the same path on the same trip under normal circumstances, so if the terminal continues to move along the travel route, it will pass only those base stations on the route that the terminal not yet passed. In that case the third indication information can be sent to the passed base stations, the third indication information being used to indicate to the passed base stations to suspend broadcasting the paging signals, and those base stations on the route that have not yet been passed continue to broadcast the signals, so as to reduce the communication resource consumption of the passed base stations.

Figure 7:
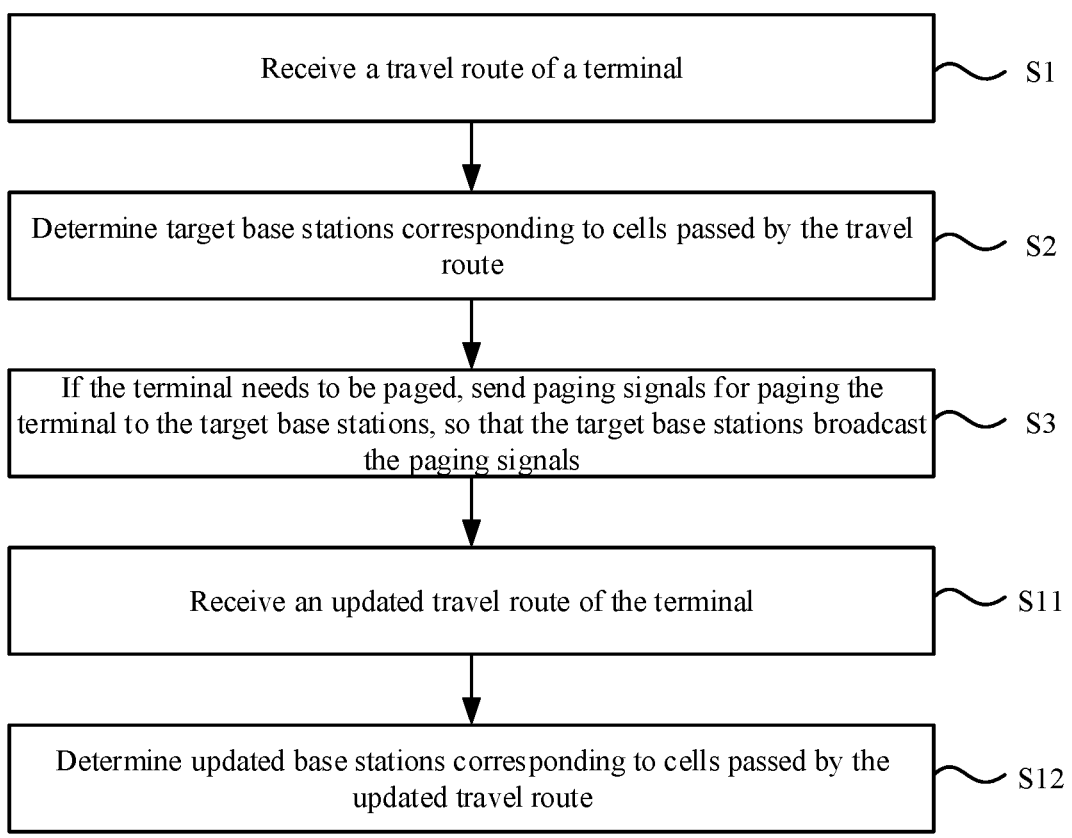
FIG. 7 is a flowchart showing yet another paging method according to an example of the disclosure.

FIG. 7 is a schematic flowchart showing yet another paging method according to an example of the disclosure. As shown in FIG. 7, in addition to S1-S3, the method further includes:

In step S11, an updated travel route of the terminal is received;

In step S12, updated base stations, i.e., base stations corresponding to cells not already traversed (passed through) by the terminal at the time of the travel route update, i.e., cells through which the terminal had not already passed at the time of the travel route update are determined.

In an example, the terminal can update the travel route and report the updated travel route to the core network, and the core network can determine updated base stations.

Figure 8:
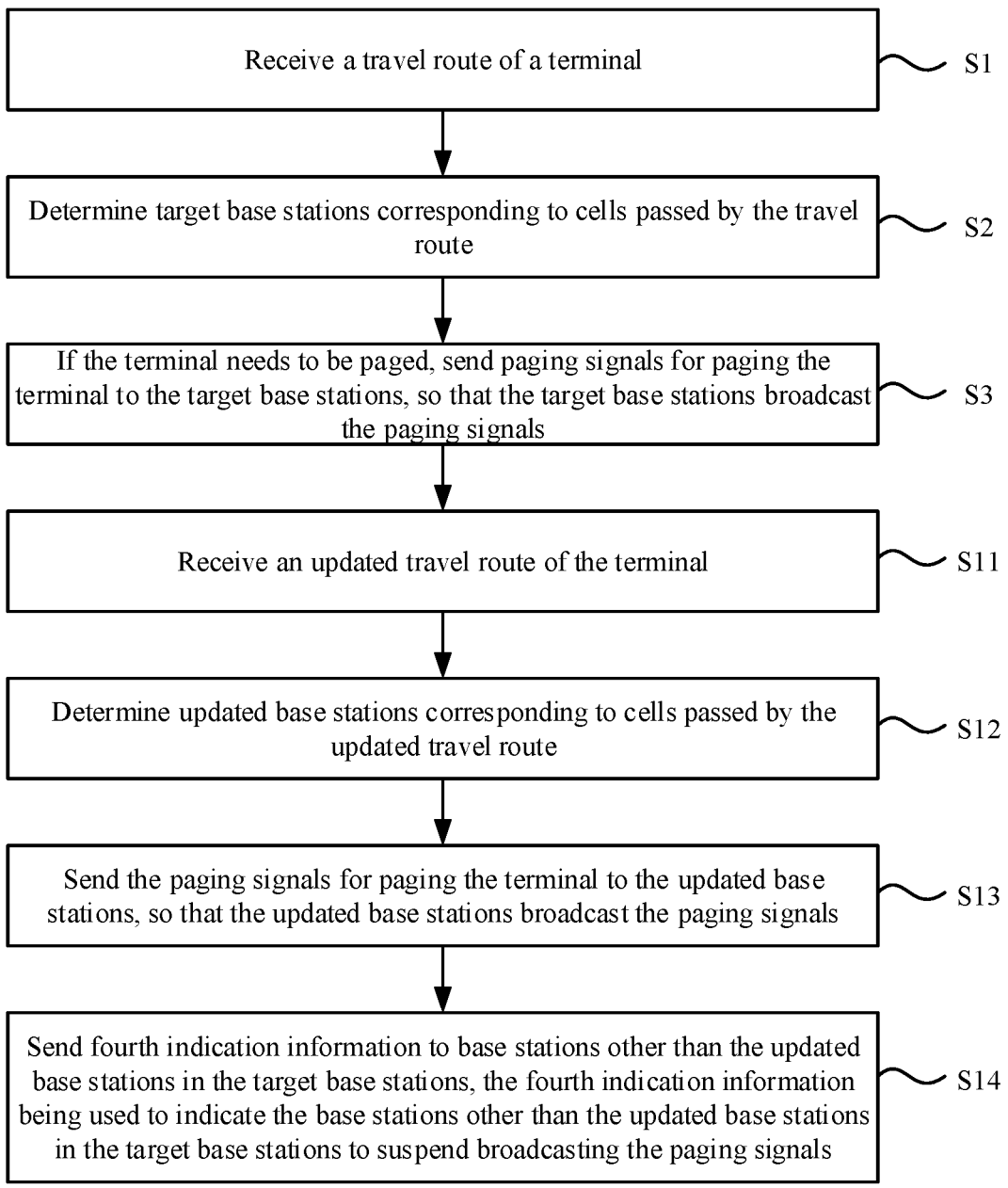
FIG. 8 is a flowchart showing yet another paging method according to an example of the disclosure.

FIG. 8 is a flowchart showing yet another paging method according to an example of the disclosure. As shown in FIG. 8, in addition to S1-S3, S11 and S12, the method further includes:

In step S13, the paging signals for paging the terminal are sent to the updated base stations, so that the updated base stations broadcast the paging signals;

In step S14, fourth indication information is sent to base stations other than the updated base stations of the target base stations, the fourth indication information being used to indicate to the base stations other than the updated base stations of the target base stations to suspend broadcasting the paging signals.

In an example, the core network can send the paging signals for paging the terminal to the updated base stations, so that the updated base stations broadcast the paging signals. In addition, the core network can also determine the base stations other than the updated base stations of the target base stations on the original travel route. These base stations are located on the original travel route instead of the updated travel route. Therefore, the terminal moves forward along the updated travel route without passing these base stations. The fourth indication information indicates to the base stations other than the updated base stations of the target base stations to suspend broadcasting the paging signals, so as to reduce the communication resource consumption of these base stations.

In an example, the target base stations are those base stations within a tracking area of the terminal.

In addition, the real-time base station and the updated base stations in the foregoing examples are also base stations in the tracking area of the terminal.

Figure 9:
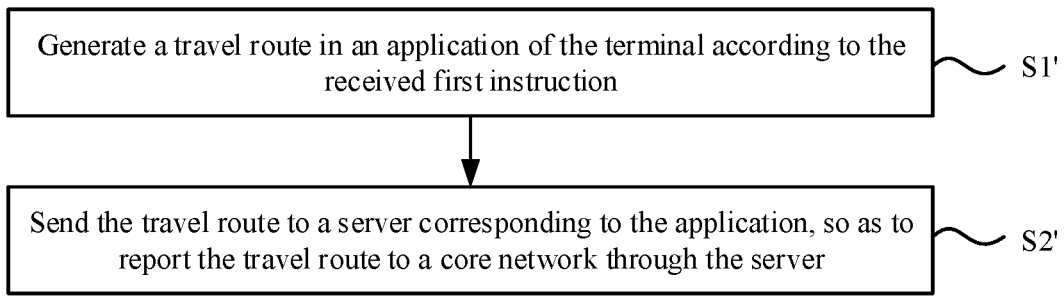
FIG. 9 is a flowchart showing a travel route reporting method according to an example of the disclosure.

FIG. 9 is a flowchart showing a travel route reporting method according to an example of the disclosure. The travel route reporting method shown in this example may be applied to a terminal. The terminal comprises, but is not limited to, one or more electronic devices such as a cell phone, a tablet computer, and a wearable device. The terminal can communicate with base stations, for example, can communicate with base stations based on 5G NR.

As shown in FIG. 9, the travel route reporting method in this example may include the following steps:

In step S1', a travel route is generated in an application of a terminal according to the received first instruction;

In step S2', the generated travel route is sent to a server corresponding to the application, so as to report the travel route to a core network through the server.

In an example, the user can input a first instruction to the terminal to cause an application of the terminal to generate a travel route. The application includes, but is not limited to, a navigation application.

Taking a cell phone as an example, the user can input a current position to an application of the cell phone, or the cell phone can automatically determine the current position as a starting position of the travel route and provide the starting position to the user. Then the user inputs the starting position to the terminal, and the application can generate a travel route from the starting position to an ending position according to road information between the starting position and the ending position.

After generating the travel route, the application can send the travel route to a server corresponding to the application, and then the server reports the travel route to the core network.

The core network can send paging signals to the base stations according to the paging method described in any of the foregoing examples, so that the base stations broadcast the paging signals to page the terminal.

Figure 10:
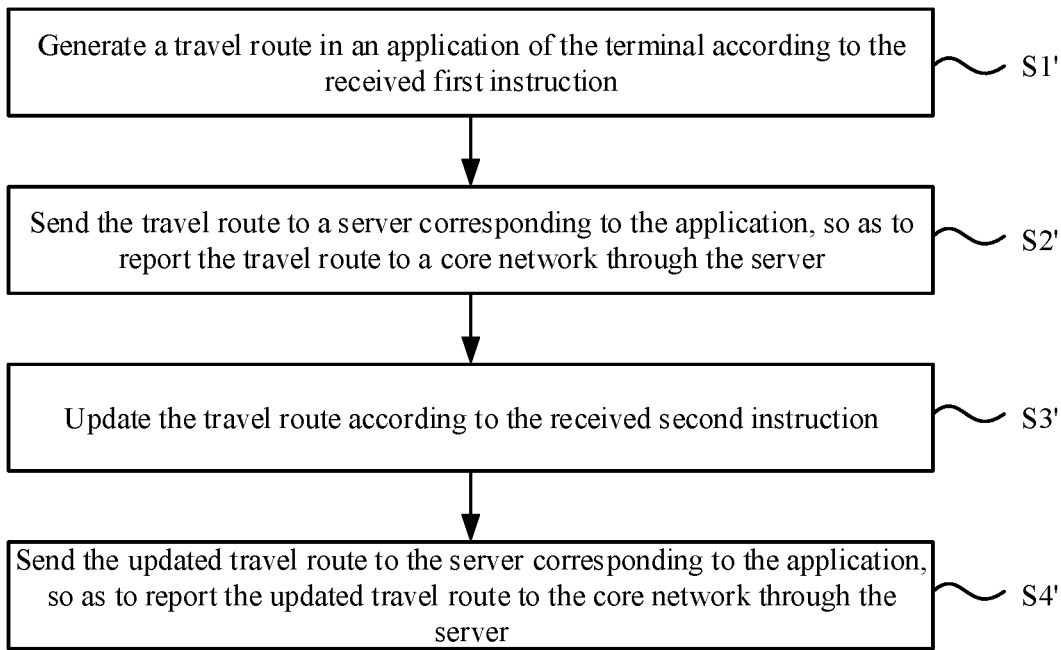
FIG. 10 is a flowchart showing another travel route reporting method according to an example of the disclosure.

FIG. 10 is a flowchart showing another travel route reporting method according to an example of the disclosure. As shown in FIG. 10, in addition to S1' and S2', the method further includes:

In step S3', the travel route is updated according to the received second instruction;

In step S4', the updated travel route is sent to the server corresponding to the application, so as to report the updated travel route to the core network through the server.

In an example, the user can update the travel route on the terminal, and the terminal can report the updated travel route to the core network, so that the core network can determine updated base stations corresponding to cells not yet passed by terminal as of the time of the updated travel route.

Figure 11:
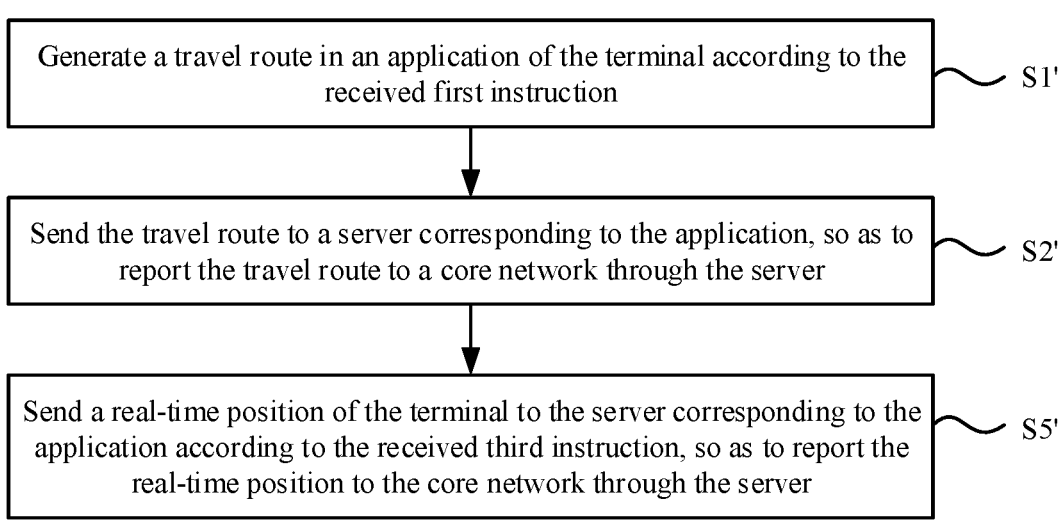
FIG. 11 is a flowchart showing yet another travel route reporting method according to an example of the disclosure.

FIG. 11 is a flowchart showing yet another travel route reporting method according to an example of the disclosure. As shown in FIG. 11, in addition to S1' and S2', the method further includes:

In step S5', a real-time position of the terminal is sent to the server corresponding to the application according to the received third instruction, so as to report the real-time position to the core network through the server.

In an example, the terminal can also report its own real-time position to the core network. For example, the application in the terminal can periodically determine the real-time position of the terminal, and then a server of the application reports the determined real-time position to the core network. Accordingly, the core network can determine the real-time base station corresponding to the real-time cell at the real-time position according to the real-time position of the terminal and pre-stored range information of cells corresponding to the base station.

In some embodiments, the server is an application function of the core network.

In some embodiments, the sending the travel route to a server corresponding to the application, so as to report the travel route to a core network through the server includes:
    sending the travel route to the server corresponding to the application, so that the server reports the travel route to the core network through an Naf interface of the application function.

In an example, the travel route reporting method described in the example of the disclosure can be implemented based on a 5G architecture; the terminal can send the travel route to the server, the server serving as an application function in the core network can report the travel route through an Naf interface, and the access and mobility management function in the core network can receive the travel route reported by the server through an Namf interface.

Corresponding to the foregoing examples of the paging method and the travel route reporting method, the disclosure further provides examples of a paging apparatus and a travel route reporting apparatus. The apparatus can include one or more processors and processor executable instructions (referred to herein as 'modules') that configure the one or more processors to perform the functions and operations specifically described herein. It will be understood embodiments include those in which a single processor can execute any one or all of the instructions (modules), as well as those in which one or more processors execute one or more of the instructions (modules) and one or more other processors execute one or more of the other instructions (modules).

Figure 12:
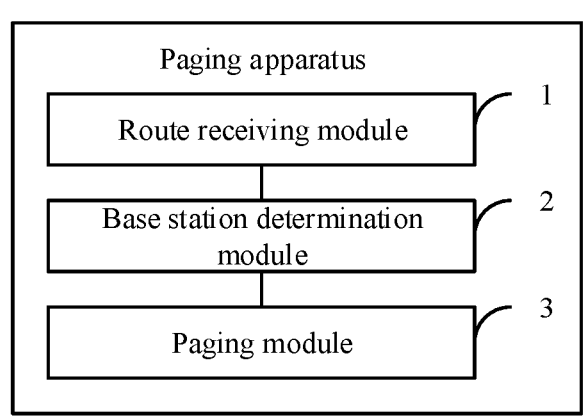
FIG. 12 is a block diagram showing a paging apparatus according to an example of the disclosure.

FIG. 12 is a block diagram showing a paging apparatus according to an example of the disclosure. The paging apparatus shown in this example may interface with a core network. As shown in FIG. 12, the paging apparatus may include:
a route receiving processor including first processor executable instructions (hereinafter 'module 1'), which configure the processor to receive a travel route of a terminal;
a base station determination processor including second processor executable instructions (hereinafter 'module 2'), which configure the base station processor to determine target base stations corresponding to cells passed by the travel route; and
a paging processor including third processor executable instructions (hereinafter 'module 3'), which configure the paging processor to send paging signals for paging the terminal to the target base stations when the terminal is to be paged, so that the target base stations broadcast the paging signals.

In some embodiments, the route receiving processor is configured to receive the travel route reported by a server corresponding to an application in the terminal.

In some embodiments, the server is an application function of the core network.

In some embodiments, the apparatus is interfaces with to an access and mobility management function of the core network.

In some embodiments, the route receiving module is configured to receive the travel route through an Namf interface of the access and mobility management function.

Figure 13:
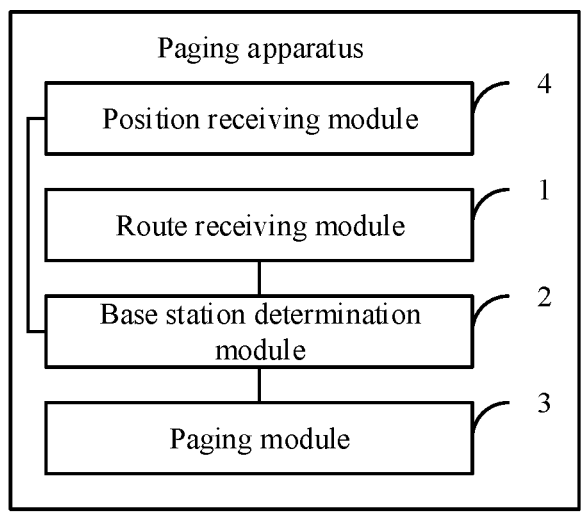
FIG. 13 is a block diagram showing another paging apparatus according to an example of the disclosure.

FIG. 13 is a block diagram showing another paging apparatus according to an example of the disclosure. As shown in FIG. 13, the apparatus further includes:
a position receiving processor including fourth processor executable instructions (hereinafter 'module 4'), which configured the processor to receive a real-time position of the terminal;
the base station determination processor is further configured by module 2 instructions to determine a real-time base station corresponding to a real-time cell at the real-time position.

Figure 14:
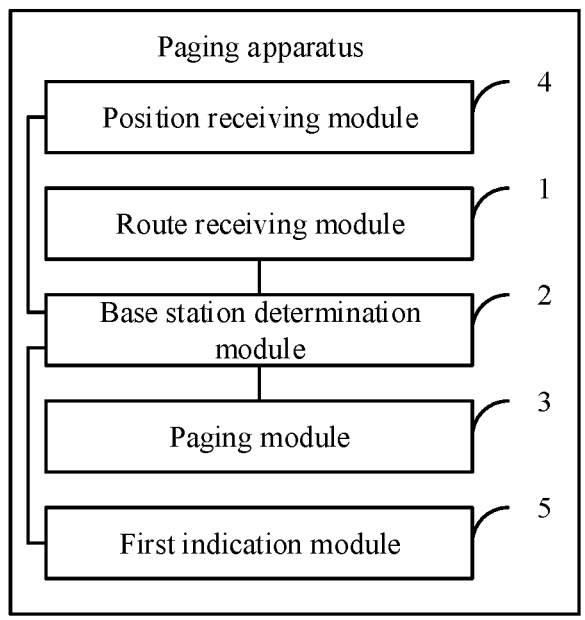
FIG. 14 is a block diagram showing yet another paging apparatus according to an example of the disclosure.

FIG. 14 is a block diagram showing yet another paging apparatus according to an example of the disclosure. As shown in FIG. 14, the apparatus further includes:
a first indication processor including fifth processor executable instructions (hereinafter 'module 5'), which configure the fifth indication processor to send first indication information to other base stations other than the real-time base station in the target base stations, the first indication information being used to indicate the other base stations to suspend broadcasting the paging signals.

Figure 15:
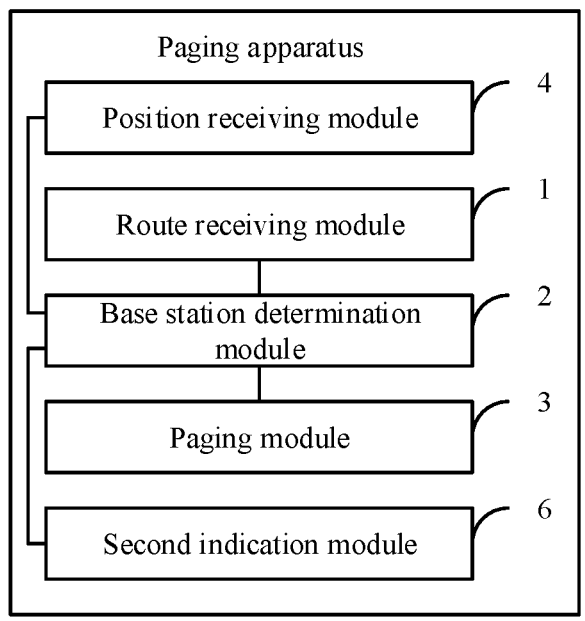
FIG. 15 is a block diagram showing yet another paging apparatus according to an example of the disclosure.

FIG. 15 is a block diagram showing yet another paging apparatus according to an example of the disclosure. As shown in FIG. 15, the apparatus further includes:
a second indication processor including sixth processor executable instructions (hereinafter 'module 6'), which configure the second indication processor to send second indication information to other base stations other than the real-time base station in the target base stations, the second indication information being used to indicate the other base stations to reduce the period of broadcasting the paging signals.

Figure 16:
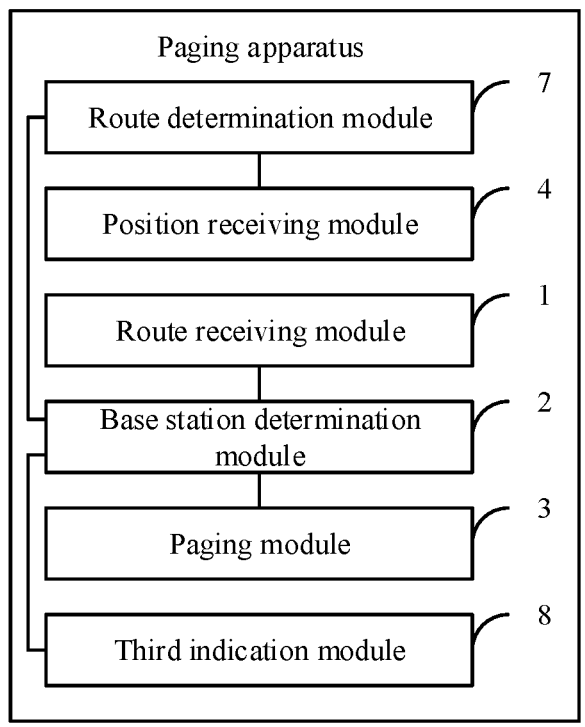
FIG. 16 is a block diagram showing yet another paging apparatus according to an example of the disclosure.

FIG. 16 is a schematic block diagram showing yet another paging apparatus according to an example of the disclosure. As shown in FIG. 16, the apparatus further includes:
a route determination processor including seventy processor executable instructions (hereinafter 'module 7'), which configure the route determination processor to determine, according to a starting position of the travel route and the real-time position, a route through which the terminal has passed (i.e., a path traversed by the terminal) in proceeding along the travel route under the condition, or at the time that the real-time position of the terminal is received;
the base station determination processor is further configured by the module 2 instructions to determine passed base stations corresponding to cells passed by the passed route; and
a third indication processor including eighth processor executable instructions (hereinafter 'module 8', which configure the third indication processor to send third indication information to the passed base stations, the third indication information being used to indicate the passed base stations to suspend broadcasting the paging signals.

Figure 17:
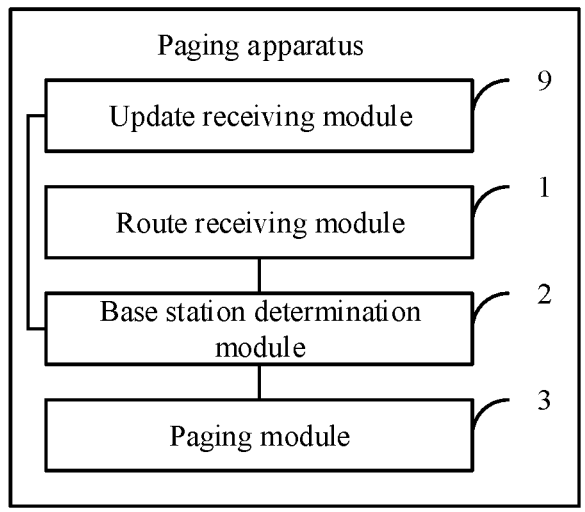
FIG. 17 is a block diagram showing yet another paging apparatus according to an example of the disclosure.

FIG. 17 is a block diagram showing yet another paging apparatus according to an example of the disclosure. As shown in FIG. 17, the apparatus further includes:
an update receiving processor including ninth processor executable instructions (hereinafter 'module 9'), which configure the update receiving processor to receive an updated travel route of the terminal;
the base station determination processor is further configured by the module 2 instructions to determine updated base stations corresponding to cells passed by the updated travel route.

Figure 18:
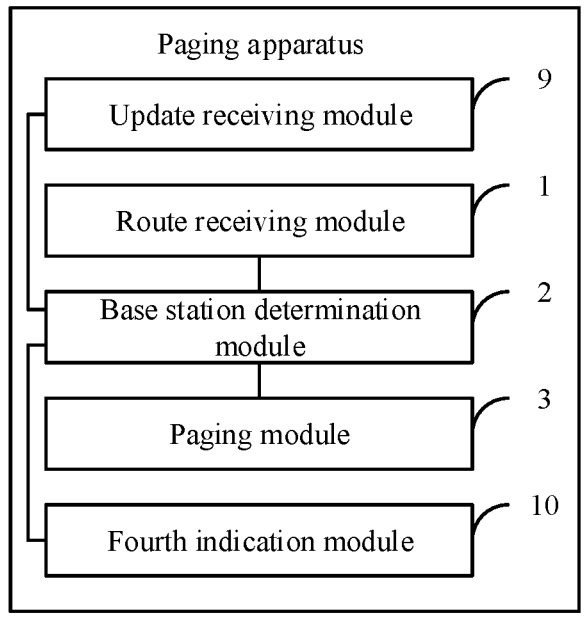
FIG. 18 is a block diagram showing yet another paging apparatus according to an example of the disclosure.

FIG. 18 is a schematic block diagram showing yet another paging apparatus according to an example of the disclosure. As shown in FIG. 18, the paging processor is further configured by the module 3 instructions to send the paging signals for paging the terminal to the updated base stations, so that the updated base stations broadcast the paging signals;
the apparatus further includes:
a fourth indication processor including tenth processor-executable instructions (hereinafter 'module 10'), that configure the fourth indication processor to send fourth indication information to base stations other than the updated base stations in the target base stations, the fourth indication information being used to indicate the base stations other than the updated base stations in the target base stations to suspend broadcasting the paging signals.

In some embodiments, the target base stations are base stations in a tracking area of the terminal.

Figure 19:
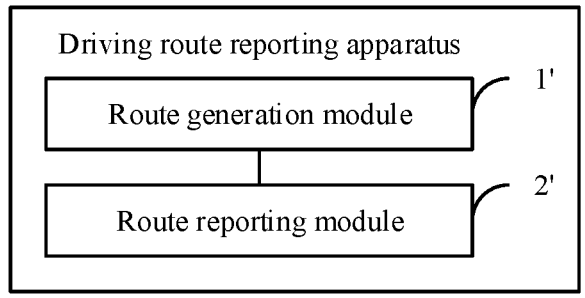
FIG. 19 is a block diagram showing a travel route reporting apparatus according to an example of the disclosure.

FIG. 19 is a block diagram showing a travel route reporting apparatus according to an example of the disclosure. The travel route reporting apparatus shown in this example may be implemented in applied to a terminal. The terminal includes, but is not limited to, at least one electronic device such as a cell phone, a tablet computer, and a wearable device. The terminal can communicate with base stations, for example, can communicate with the base stations based on 5G NR.

As shown in FIG. 19, the travel route reporting apparatus in this example may include:
- a route generation processor including processor executable instructions (hereinafter 'module 1''), which configure the route generation processor to generate a travel route in an application of the terminal according to the received first instruction; and
- a route reporting processor including processor-executable instructions (hereinafter 'module 2''), which configure the route reporting processor to send the travel route to a server corresponding to the application, so as to report the travel route to a core network through the server.

Figure 20:
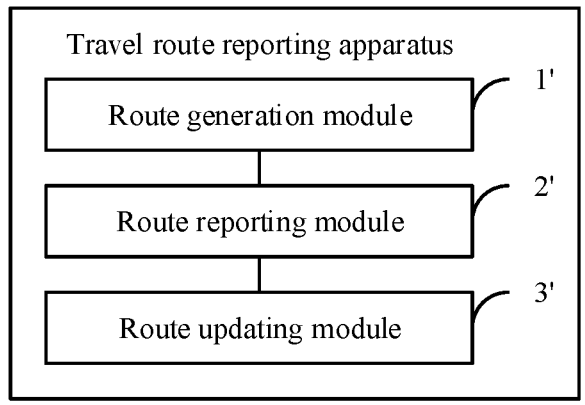
FIG. 20 is a block diagram showing another travel route reporting apparatus according to an example of the disclosure.

FIG. 20 is a schematic block diagram showing another travel route reporting apparatus according to an example of the disclosure. As shown in FIG. 20, the apparatus further includes:
- a route updating processor including processor-executable instructions (hereinafter 'module 3''), which configure the route updating processor to update the travel route according to the received second instruction;

The route reporting processor is further configured by module 2' to send the updated travel route to the server corresponding to the application, so as to report the updated travel route to the core network through the server.

Figure 21:
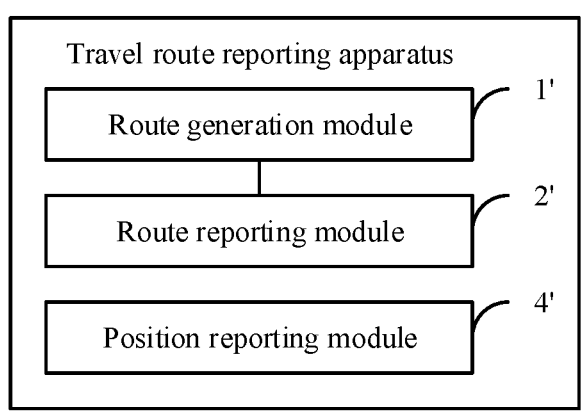
FIG. 21 is a block diagram showing yet another travel route reporting apparatus according to an example of the disclosure.

FIG. 21 is a schematic block diagram showing yet another travel route reporting apparatus according to an example of the disclosure. As shown in FIG. 21, the apparatus further includes:
- a position reporting processor including processor executable instructions (hereinafter 'module 4'''), that configure the position reporting processor to send a real-time position of the terminal to the server corresponding to the application according to the received third instruction, so as to report the real-time position to the core network through the server.

In some embodiments, the server is an application function of the core network.

In some embodiments, the route reporting module is configured to send the travel route to the server corresponding to the application, so that the server reports the travel route to the core network through an Naf interface of the application function.

With regard to the apparatuses in the above examples, the specific manners that the respective modules perform operations have been described in detail in the examples relating to the methods, and details are not repeated hereinbelow.

The functions performed by the apparatus examples substantially correspond to the steps comprising the method examples, so reference may be made to the descriptions of the method examples to describe the apparatus functions. The apparatus examples described above are merely representative, the processors and their corresponding modules illustrated as separate components may be or may not be physically separated, and the components displayed as modules that configure one or more corresponding processors to perform functions, may be or may not be physical modules, that is, the components may be positioned at one place or may also be distributed on a plurality of network devices and their corresponding modules. Some or all of the modules may be selected for execution according to actual needs to achieve the objectives of the solutions of the examples. Those of ordinary skill in the art, upon reading this disclosure can understand and implement the various embodiments without any creative effort and without undue experimentation.

An example of the disclosure further proposes an electronic device, including:
- a processor; and
- a memory for storing processor executable instructions (referred to herein as 'modules');
- the processor is configured by corresponding modules to implement the paging method described in any of the foregoing examples.

An example of the disclosure further proposes an electronic device, including:
- a processor; and
- a memory for storing processor executable instructions (referred to by function as 'module');
- the processor is configured by one or more corresponding modules to implement the travel route reporting method described in any of the foregoing examples.

An example of the disclosure further proposes a non-transitory computer-readable storage medium, storing a computer program thereon. The computer program comprises functional modules. When the program is executed by a processor, the steps of the paging method described in any of the foregoing examples are implemented.

An example of the disclosure further proposes a non-transitory computer-readable storage medium, storing a computer program thereon as one or more modules. When the modules of the program are executed by a corresponding processor, the steps of the travel route reporting method in any of the foregoing examples are implemented.

Figure 22:
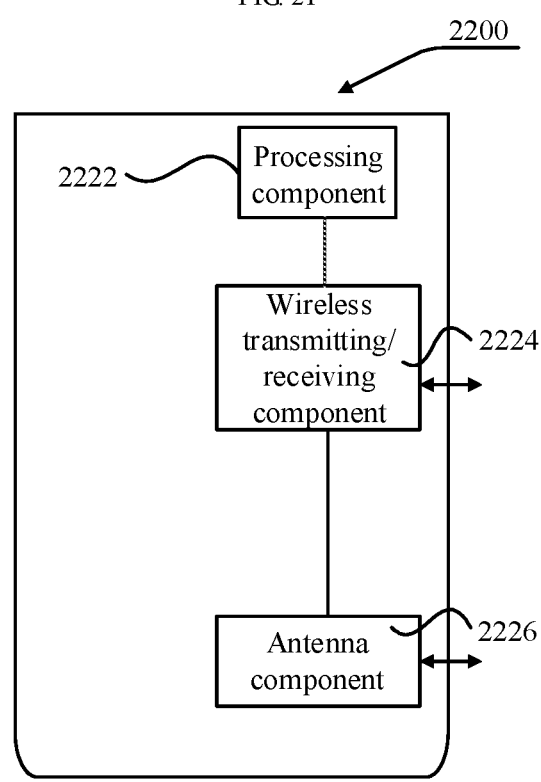
FIG. 22 is a schematic diagram showing an apparatus for reporting a travel route according to an example of the disclosure.

As shown in FIG. 22, FIG. 22 is a block diagram of an apparatus 2200 for reporting a travel route according to an example of the disclosure. The apparatus 2200 may be provided as a base station. Referring to FIG. 22, the apparatus 2200 includes a processor comprising processing component 2222, a wireless transmitting/receiving device such as a wireless transceiver comprising component 2224, an antenna comprising component 2226, and a signal processor specific to a wireless interface (not shown). As noted above processing component 2222 comprises one or more processors. One of the processors comprising the processing component 2222 may be configured by one or more modules to implement the travel route reporting method described in any of the foregoing examples.

Figure 23:
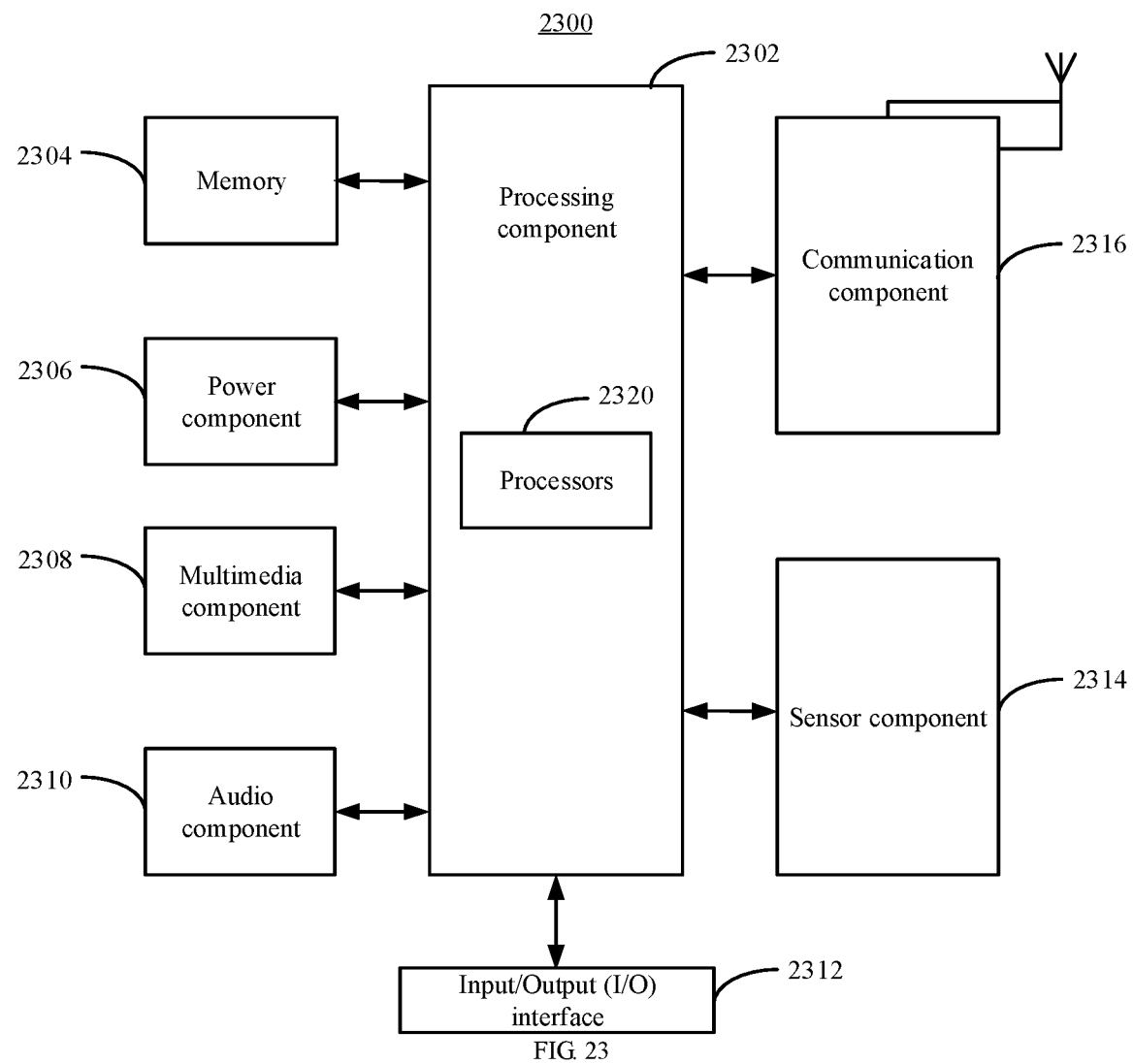
FIG. 23 is a schematic diagram showing an apparatus for paging according to an example of the disclosure.

FIG. 23 is a schematic diagram showing an apparatus 2300 for paging according to an example of the disclosure. For example, the apparatus 2300 may comprise one or more of a cell phone, a computer, a digital broadcasting terminal, a messaging device, a game console, a tablet device, a medical device, a fitness device, a personal digital assistant, etc.

Referring to FIG. 23, the apparatus 2300 may include one or more of the following components: a processing component 2302, a memory 2304, a power component 2306 comprising a power supply, a multimedia device represented by component 2308, an audio device, represented by component 2310, an input/output (I/O) interface 2312, one or more sensors represented by component 2314, and a communication device represented by component 2316.

The processing component 2302 usually controls the overall operations of the apparatus 2300, such as operations associated with display, telephone call, data communication, camera operation and recording operation. The processing component 2302 may include one or more processors 2320 configured by processor executable instructions to perform all of or part of the steps of the above method. In addition, the processing component 2302 may include one or more modules that configure one or more corresponding processor to carry out functions to facilitate the interaction between the processing component 2302 and other components. For example, the processing component 2302 may include a multimedia module to configure one or more processors to perform operations to facilitate interaction between the multimedia device represented by component 2308 and the processing component 2302.

The memory 2304 is configured to store various types of data and computer-executable instructions (modules) to support operations at the apparatus 2300. Examples of these data and instructions include instructions for any application or method performed by operations of the apparatus 2300, contact data, phone book data, messages, pictures, videos, etc. The memory 2304 may be implemented by any type of volatile or non-volatile storage device or a combination thereof, such as a static random access memory (SRAM), an electrically erasable programmable read-only memory (EEPROM), an erasable. programmable read-only memory (EPROM), a programmable read-only memory (PROM), a read-only memory (ROM), a magnetic memory, a flash memory, a magnetic disk or an optical disk. The memory may comprise any non-transitory storage medium for storing computer or processor executable instructions.

The power supply represented by component 2306 provides power for various components of the apparatus 2300. The power supply represented by component 2306 may include a power management system, one or more power sources, and other components associated with power generation, management and distribution of the apparatus 2300.

The multimedia device represented by component 2308 includes a screen for providing an output interface between the apparatus 2300 and the user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, slides and gestures on the touch panel. The touch sensor may sense not only the boundary of the touch or slide, but also the duration and pressure associated with the touch or slide. In some examples, the multimedia device represented by component 2308 includes a front camera and/or a rear camera. When the apparatus 2300 is in an operation mode, such as a shooting mode or a video mode, the front camera and/or the rear camera can receive external multimedia data. Each front or rear camera may be a fixed optical lens system or have focal length and optical zoom capability.

The audio device represented by component 2310 is configured to output and/or input audio signals. For example, the audio device represented by component 2310 includes a microphone (MIC), and when the apparatus 2300 is in an operation mode, such as a call mode, a recording mode and a voice recognition mode, the microphone is configured to receive external audio signals. The received audio signals may be further stored in the memory 2304 or sent by the communication device represented by component 2316. In some examples, the audio device represented by component 2310 further includes a speaker for outputting audio signals.

The I/O interface 2312 provides an interface between the processing component 2302 and a peripheral interface device or module. The peripheral interface device may be a keyboard, a click wheel, a button, etc. The button may include but is not limited to a home button, a volume button, a start button and a lock button.

The sensor represented by component 2314 includes one or more sensors for providing various aspects of status assessment for the apparatus 2300. For example, the sensor represented component 2314 may detect the on/off state of the apparatus 2300, and relative positions of components such as a display and a keypad of the apparatus 2300. The sensor represented by component 2314 may also detect a position change of the apparatus 2300 or a device or component of the apparatus 2300, presence or absence of contact between the user and the apparatus 2300, an orientation or acceleration/deceleration of the apparatus 2300 and a temperature change of the apparatus 2300. The sensor represented by component 2314 may include a proximity sensor configured to detect the presence of nearby objects without any physical contact. The sensor represented by component 2314 may also include an optical sensor, such as a CMOS or CCD image sensor, for use in imaging applications. In some examples, the sensor represented by component 2314 may also include an acceleration sensor, a gyroscope sensor, a magnetic sensor, a pressure sensor or a temperature sensor.

The communication device represented by component 2316 is configured to facilitate wired or wireless communication between the apparatus 2300 and other devices. The apparatus 2300 may access wireless networks based on communication standards, such as Wi-Fi, 2G, 3G, 4G LTE, 5G NR, or a combination thereof. In an exemplary example, the communication device represented by component 2316 receives broadcast signals or broadcast associated information from an external broadcast management system via a broadcast channel. In an exemplary example, the communication device represented by component 2316 further includes a near field communication (NFC) device to facilitate short-range communication. For example, the NFC device may be implement radio frequency identification (RFID) technology, infrared data association (IrDA) technology, ultra wide band (UWB) technology, Bluetooth (BT) technology, and other technologies.

In an exemplary example, the apparatus 2300 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors or other electronic components to execute the paging method described in any of the foregoing examples.

In an exemplary example, a non-transitory computer-readable storage medium including instructions comprising one or more modules is further provided, such as a memory 2304 including instructions executable by the processor 2320 of the apparatus 2300 to complete the above method. For example, the non-temporary computer-readable storage medium may be an ROM, a random access memory (RAM), a CD-ROM, a magnetic tape, a floppy disk, an optical data storage device, etc.

Those skilled in the art would readily appreciate other examples within the scope of the disclosure after considering the specification and practicing appreciating the scope of the disclosure herein. The disclosure is intended to cover any variations, uses or adaptive changes of the disclosure. These variations, uses or adaptive changes follow the general principle of the disclosure and include common general knowledge or conventional technical means in the technical field that need not be explicitly disclosed in the disclosure. The description and the examples are merely regarded as exemplary, and the real scope and spirit of the disclosure are pointed out by the following claims.

It should be understood that the disclosure is not limited to the precise structure described above and shown in the drawings, and various modifications and changes can be made without departing from its scope. The scope of the disclosure is only limited by the appended claims.

It should be noted that the relational terms herein such as first and second are used only to differentiate an entity or operation from another entity or operation, and do not require or imply any actual relationship or sequence between these entities or operations. The terms "include", "comprise", or any variants thereof are intended to cover a non-exclusive inclusion, so that a process, method, article, or device that includes a series of elements not only includes those elements, but also includes other elements not listed explicitly, or includes inherent elements of the process, method, article, or device. In the absence of more limitations, an element defined by "include a . . . " does not exclude other same elements existing in the process, method, article, or device including the element. In other words, the term 'comprising' and 'including; are open ended terms.

The methods and apparatuses provided by the examples of the disclosure are described in detail above. Specific examples are used herein to illustrate the principles and implementations of the disclosure. The descriptions of the above examples are only used to help understanding the method and core idea of the disclosure. In addition, changes may be made to the specific examples and the application scope according to the idea of the disclosure for a person skilled in the art. To sum up, the specific examples contained in the specification should not be understood as limitations on the scope of the disclosure.

The invention claimed is:

1. A paging method performed by a core network, the method comprising:
   receiving a travel route of a terminal;
   determining target base stations corresponding to cells passed by the travel route; and
   in response to determining that the terminal is to be paged, sending a paging signal for paging the terminal to the target base stations, so that the target base stations broadcast the paging signal;
   receiving a real-time position of the terminal;
   in response to the real-time position of the terminal is received, determining, according to a starting position of the travel route and the real-time position, a route that the terminal has passed in the travel route;
   determining passed base stations corresponding to cells passed by the route; and
   sending third indication information to the passed base stations, wherein the third indication information is used to indicate the passed base stations to suspend broadcasting the paging signal.

2. The paging method according to claim 1, wherein the receiving the travel route of the terminal comprises:
   receiving the travel route reported by a server corresponding to an application in the terminal.

3. The paging method according to claim 2, wherein the server is an application function of the core network.

4. The paging method according to claim 1, wherein the method is applicable to an access and mobility management function of the core network.

5. The paging method according to claim 4, wherein the receiving the travel route of the terminal comprises:
   receiving the travel route through an Namf interface of the access and mobility management function.

6. The paging method according to claim 1, further comprising:
   determining a real-time base station corresponding to a real-time cell at the real-time position.

7. The paging method according to claim 6, further comprising:
   sending first indication information to other base stations other than the real-time base station in the target base stations, wherein the first indication information is used to indicate the other base stations to suspend broadcasting the paging signal.

8. The paging method according to claim 6, further comprising:
   sending second indication information to other base stations other than the real-time base station in the target base stations, wherein the second indication information is used to indicate the other base stations to reduce a period of broadcasting the paging signal.

9. The paging method according to claim 1, further comprising:
   receiving an updated travel route of the terminal; and
   determining updated base stations corresponding to cells passed by the updated travel route.

10. The paging method according to claim 9, further comprising:
    sending the paging signal for paging the terminal to the updated base stations, so that the updated base stations broadcast the paging signal; and
    sending fourth indication information to base stations other than the updated base stations in the target base stations, wherein the fourth indication information is used to indicate the base stations other than the updated base stations in the target base stations to suspend broadcasting the paging signal.

11. The paging method according to claim 1, wherein the target base stations are base stations in a tracking area of the terminal.

12. A travel route reporting method, applicable to a terminal, the method comprising:
    generating a travel route in an application of the terminal according to a received first instruction; and
    sending the travel route to a server corresponding to the application, so as to report the travel route to a core network through the server;
    sending a real-time position of the terminal to the server corresponding to the application according to a received third instruction, so as to report the real-time position to the core network through the server;
    wherein the real-time position is used by the core network to determine passed base stations corresponding to cells passed by the travel route, and to send third indication information to the passed base stations,
    wherein the third indication information is used to indicate the passed base stations to suspend broadcasting a paging signal.

13. The travel route reporting method according to claim 12, further comprising:
    updating the travel route according to a received second instruction; and sending a updated travel route to the server corresponding to the application, so as to report the updated travel route to the core network through the server.

14. The travel route reporting method according to claim 12, wherein the server is an application function of the core network.

15. The travel route reporting method according to claim 14, wherein the sending the travel route to the server corresponding to the application, so as to report the travel route to the core network through the server comprises:

sending the travel route to the server corresponding to the application, so that the server reports the travel route to the core network through an Naf interface of the application function.

16. An electronic device, comprising:

a processor; and a memory that stores executable instruction;

wherein the executable instructions when executed by the processor cause the electronic device to act as the terminal and perform the travel route reporting method according to claim 12.

17. An electronic device, comprising:

a processor; and a memory for storing a processor executable instruction;

wherein the processor is configured to:

receive a travel route of a terminal;

determine target base stations corresponding to cells passed by the travel route; and in response to the terminal needs to be paged, send a paging signals for paging the terminal to the target base stations, so that the target base stations broadcast the paging signals;

receive a real-time position of the terminal;

in response to the real-time position of the terminal is received, determine, according to a starting position of the travel route and the real-time position, a route that the terminal has passed in the travel route;

determine passed base stations corresponding to cells passed by the route; and send third indication information to the passed base stations, wherein the third indication information is used to indicate the passed base stations to suspend broadcasting a paging signal.

* * * * *